United States Patent
Carthew et al.

(10) Patent No.: US 12,172,777 B2
(45) Date of Patent: Dec. 24, 2024

(54) RESILIENT UNMANNED AERIAL VEHICLE LANDING PLATFORMS

(71) Applicant: Ford Global Technologies, LLC, Dearborn, MI (US)

(72) Inventors: James Carthew, Ann Arbor, MI (US); Nelson Alexander Brock, Sebastopol, CA (US); John Galin, Mill Valley, CA (US); Siddharthan Selvasekar, Livermore, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 18/166,129

(22) Filed: Feb. 8, 2023

(65) Prior Publication Data
US 2024/0262546 A1    Aug. 8, 2024

(51) Int. Cl.
| | | |
|---|---|---|
| *B64U 70/93* | (2023.01) | |
| *B64F 1/02* | (2006.01) | |
| *B64U 70/95* | (2023.01) | |
| *G08G 5/00* | (2006.01) | |
| *G08G 5/02* | (2006.01) | |

(52) U.S. Cl.
CPC .............. *B64U 70/93* (2023.01); *B64F 1/02* (2013.01); *B64U 70/95* (2023.01); *G08G 5/0069* (2013.01); *G08G 5/025* (2013.01); *B64U 2201/00* (2023.01)

(58) Field of Classification Search
CPC .......... B64F 1/02; B64U 70/30; B64U 70/99; A47L 19/04
See application file for complete search history.

(56) References Cited

U.S. PATENT DOCUMENTS

| | | | |
|---|---|---|---|
| 4,653,706 A * | 3/1987 | Ragiab | B64F 1/02 405/1 |
| 7,344,036 B2 * | 3/2008 | Jerstroem | A47L 19/04 211/41.6 |
| 8,955,800 B2 * | 2/2015 | McGeer | B64U 30/20 244/116 |
| 9,650,156 B2 * | 5/2017 | McChesney | B64D 5/00 |
| 10,077,095 B1 * | 9/2018 | McChesney | B64D 5/00 |
| 10,434,885 B2 | 10/2019 | Antonini et al. | |
| 10,457,419 B2 * | 10/2019 | McChesney | B64F 5/50 |
| 10,577,126 B2 | 3/2020 | Mozer | |

(Continued)

FOREIGN PATENT DOCUMENTS

KR      102317955 B1 * 10/2021
WO    WO-2023233608 A1 * 12/2023

OTHER PUBLICATIONS

Grass Countertop drying Rack. May 31, 2022. TOMY. Retrieved via Internet Archive https://web.archive.org/web/20220531210758/ https://us.tomy.com/grass-green/.*

(Continued)

*Primary Examiner* — Joseph W Sanderson
(74) *Attorney, Agent, or Firm* — Emily Drake; Eversheds Sutherland (US) LLP

(57) ABSTRACT

Resilient unmanned aerial vehicle landing platforms are disclosed herein. An example device includes a base plate having protuberances that are arranged into rows of concentric rings, each of the protuberances being a conical member that extends orthogonally from the base plate, wherein each of the protuberances is resilient and are adapted to arrest and protect the drone during landing.

9 Claims, 8 Drawing Sheets

(56) References Cited

U.S. PATENT DOCUMENTS

| | | | | |
|---|---|---|---|---|
| 10,631,711 | B2* | 4/2020 | Dunn | A47L 19/02 |
| 11,046,456 | B2* | 6/2021 | Fujita | B64F 1/12 |
| 11,459,117 | B1* | 10/2022 | Shapiro | B64U 70/90 |
| 11,597,515 | B2* | 3/2023 | Passley | B64U 50/35 |
| 2004/0134866 | A1* | 7/2004 | Jerstroem | A47L 19/04 |
| | | | | 211/41.6 |
| 2013/0161447 | A1* | 6/2013 | McGeer | B64U 70/80 |
| | | | | 244/110 F |
| 2016/0229557 | A1* | 8/2016 | McChesney | B64G 1/66 |
| 2017/0129603 | A1 | 5/2017 | Raptopoulos et al. | |
| 2017/0245730 | A1* | 8/2017 | Dunn | A47L 19/04 |
| 2018/0370653 | A1* | 12/2018 | Fujita | B64U 70/97 |
| 2019/0047724 | A1* | 2/2019 | McChesney | B64G 1/6462 |
| 2021/0053677 | A1* | 2/2021 | Passley | B64U 50/38 |

OTHER PUBLICATIONS

Musa Galimov, et al., UAV Positioining Mechanisms in Landing Stations: Classification and Engineering Design Review, Sensors 2020, 20, 3648, Jun. 29, 2020, 1-31.

* cited by examiner

RESILIENT UNMANNED AERIAL VEHICLE LANDING PLATFORMS

BACKGROUND

Unmanned aerial vehicles (UAVs), such as drones or the like, can be launched from a variety of platforms, both fixed and mobile. Drone landing and takeoff procedures can be complicated by wind or other environmental factors, and the drone may use specific maneuvers, such as accelerated landing and/or freefall, to avoid or compensate for wind shear or other environmental factors. However, most drones are not ruggedized or built to withstand forces that the drone may encounter when performing these maneuvers. In some instances, during drone landing procedures, some implementations involve passive capture systems or other methods. In addition, methods for guiding drones into a landing zone may involve the use of beacons or other elements that the drone can use to track the landing zone.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
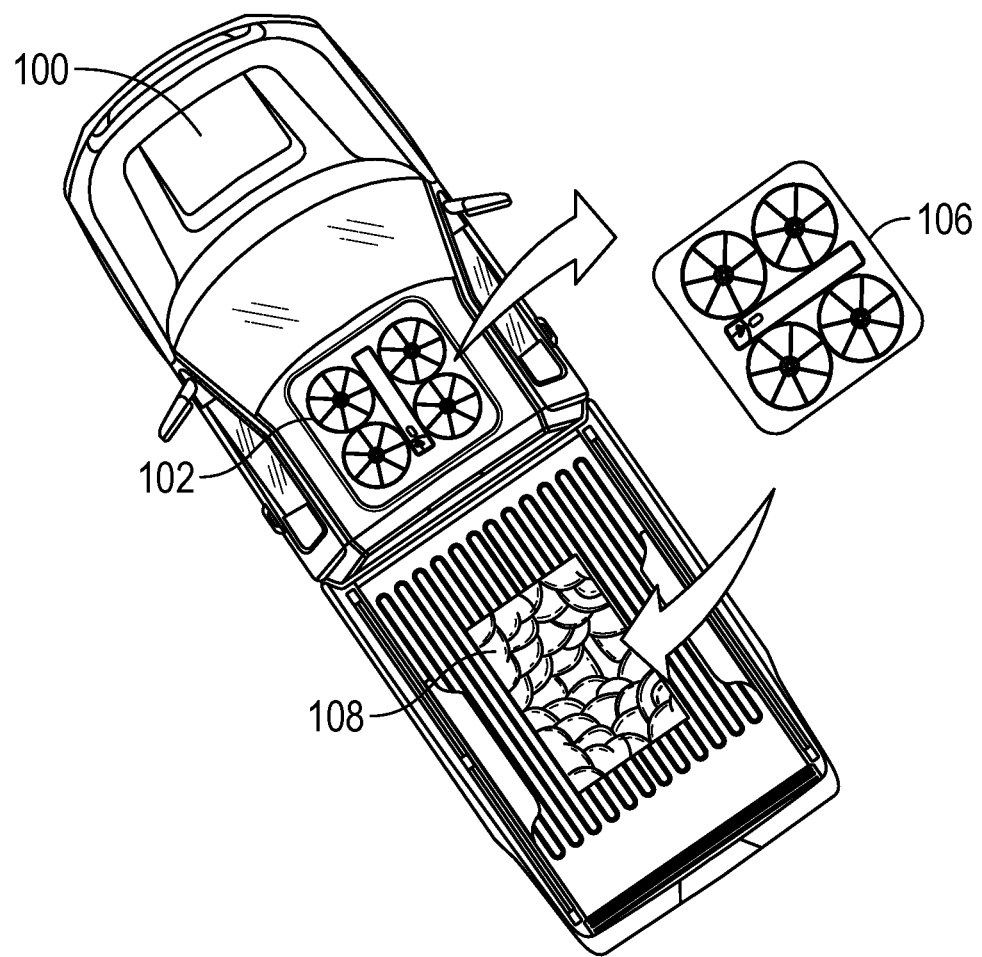
FIG. 1 is a perspective view of an example system in accordance with one or more embodiments of the present disclosure.

In some instances, the present disclosure can include a landing platform that allows a drone to land thereon. In certain embodiments, the landing platform may be located on a truck. For example, the drone can land on a roof or in a truck bed for transportation. However, landing in a truck bed may involve the user manually adjusting the drone before the next flight. A drone can be configured to autonomously land in an area the size of a moonroof of a truck. In some cases, this can be achieved using a marker/beacon as a positioning aid during the final stages of descent.

Reflected air can buffer the drone at low altitude, and a precision landing strategy may include an accelerated decline or freefall of the drone for the final moments of landing. Accelerated/freefall landing strategies require consideration of the structure and mechanical capabilities of the drone airframe. If the drone drops too far, it can be damaged. This can be prevented by allowing the drone to land on something soft, resilient, and/or malleable.

The low mass and high fragility of the drone airframe are not well suited to aggressive driving (such as recreational 4WD) while transporting an unsecured drone in the truck bed or on the roof. Securing a drone using active methods (robotic graspers, clamps, and the like) is complicated and expensive. Passive solutions are appropriate for recreational 4WD applications. The more effective the passive capture method is at holding the UAV, the more likely it is difficult for the user to remove the UAV. Removing a UAV that has been sufficiently tangled in a passive capture solution could result in broken propellers or airframes.

As passive capture methods are intended to ensnare the UAV upon contact, the propellers may be either shrouded or motionless prior to contacting the landing platform. Modern drones are capable of 'locking' their propellers, making an accelerated/freefall landing onto a passive capture surface possible.

Wireless beacons can be sensed by the drone using a calibrated camera to determine an angle and distance between the beacon and the camera (and drone) if the entire marker is mounted on a flat, rigid base. The arrangement of the passive landing surface can be configured to prevent obscuring any markers/beacons from the view of the drone during landing.

Disclosed herein are systems and methods for allowing a UAV or drone to land securely, even when the drone is maneuvering rapidly when landing. An example landing platform can include arresting protuberances that damp and arrest the drone at landing. An example landing platform can be a passive securing device that ensures any landing marker or beacon is visible to the drone. The landing platform can provide a soft-landing surface to a freefalling drone (assuming a predetermined amount of freefall). The landing platform can be integrated into a mobile platform such as a vehicle. When configured on a vehicle, the landing platform can be configured to secure the drone during aggressive driving. The landing platform can also allow for quick and easy removal of the drone.

In some configurations, the landing platform includes densely arranged protuberances made from a flexible material. Each protuberance may be conical in shape such that its flexibility increases towards a tip or terminal end of the protuberance. A length of the tallest protuberances can be set at an example height, such as 100 mm, however, the exact height of the protuberances can be adjusted based on drone size/weight. Other 'tangle-proof' geometries, in addition to conical shapes, can be used. For example, a rectangular cross-section is also effective and may be used along the tapered arrest protuberances. An alternative design could use fibrous material for the cushioning and damping action, replacing the conical protuberances with a brush.

A height of the protuberances increases towards the extremities or peripheral edges of the landing platform. A center of the landing area can be flat and unobscured to allow for the placement of a wireless beacon. The material selected can be rigid enough that the protuberances can support their weight, but flexible enough that they deform under the weight of the drone.

In general, after performing flight operations, the drone approaches the landing platform by locating and navigating to the wireless beacon. In some instances, at an altitude, and directly above the landing area, the propellers of the drone can be locked and the drone can enter a freefall.

If the geometry of the propeller cage permits, the propellers do not have to lock and the drone can perform a standard (e.g., not freefall) landing sequence. The flexible protuberances cushion the landing of the drone, some of the protuberances may resiliently deform to shape around the drone, while other protuberances may be caught beneath the drone or pushed aside.

The motion of the drone in any direction may be damped by the protuberances such that the structural integrity of the drone is maintained. Removing the drone is as easy as pulling it up and away from the protuberances as compared to extricating an airframe from netting (where parts of the drone are likely to get caught in the net). In some platform configurations (where the landing platform is integrated into a roof of the vehicle), the drone can be pulled downwards and through the landing platform into a vehicle, which provides more convenience for the user in the cabin of the vehicle.

In one example, the landing platform can be motorized, making it retractable. For example, by retracting the protuberances below the propellers, the drone can take off from this landing platform. The protuberances can be extended to catch the drone when it returns.

Illustrative Embodiments

Turning now to the drawings, FIG. 1 depicts a vehicle, such as a truck 100, in combination with a launching platform 102 and a landing platform 104, along with a drone 106. The drone 106 can communicate with the landing platform 104 and/or the truck 100 over a network 108. In general, the network 108 (see FIG. 3A) can include any public and/or private network that allows for bilateral communication between the drone 106 and the truck 100 and/or landing platform 104.

Figure 2:
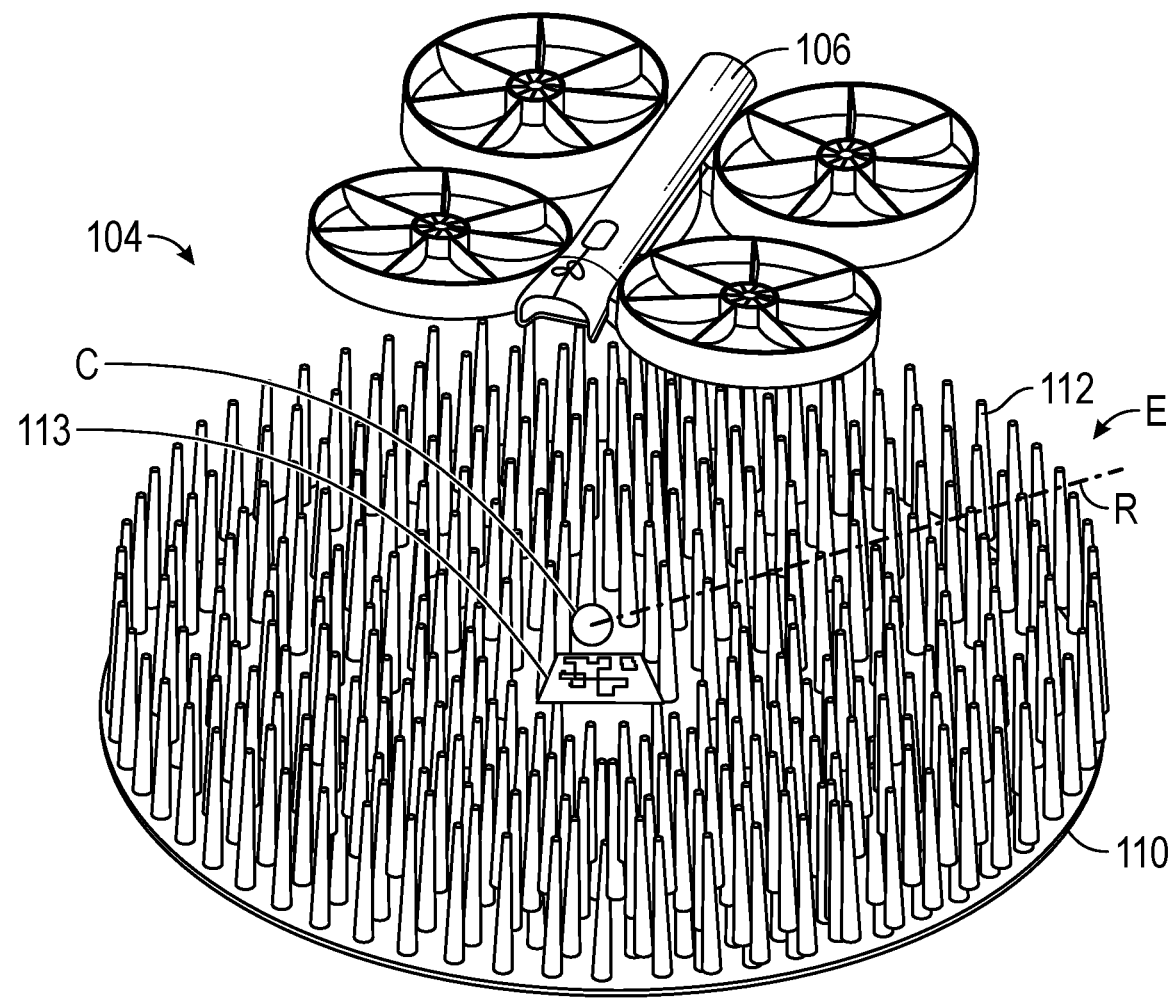
FIG. 2 is a perspective view of an example drone in combination with a landing platform in accordance with one or more embodiments of the present disclosure.

Referring to FIG. 2, the landing platform 104 can include a base 110 that can support a plurality of protuberances 112. The protuberances 112 extend from the base 110 and are generally configured to provide a soft landing zone for the drone 106. In some configurations, the protuberances 112 are arranged into concentric rows of rings. The protuberances 112 can be arranged in any suitable combination. For example, the protuberances 112 may form a square, rectangle, triangle, or the like. The protuberances 112 may be arranged in any suitable shape.

Each of the protuberances 112 can be formed from a flexible material. In this manner, the protuberances 112 may be configured to bend or the like during the landing and capture of a drone 106 on the landing platform 104, but may generally conform back to their repose position once the drone 106 is removed from the landing platform 104. In certain embodiments, the protuberances 112 can be conical in shape. For example, the protuberances 112 may extend upward from the base 110 to a pointed end. The protuberances 112 may be any suitable size, shape, or configuration. For example, the protuberances 112 may be triangular, tubular, square, or the like.

In certain embodiments, each of the protuberances 112 can extend orthogonally from an upper surface of the base 110. The protuberances 112 can have a material profile that is more rigid at the intersection between the protuberances 112 and the base 110 to provide structural support to the protuberances 112 to keep in a substantially upright posture relative to the base 110. The material properties of the protuberances 112 can vary along its length. For example, while being more rigid at its base, the protuberances 112 can be more flexible or resilient towards its opposing terminal end. The protuberances 112 can be made from any number of materials that would be known to one of ordinary skill in the art. In addition, the protuberances 112 can be made from a material that provides a tacky outer surface for the protuberances 112. This tackiness may help arrest the drone 106 when it contacts the protuberances 112 during landing on the platform 104.

In some configurations, the protuberances 112 vary in size along a radius R of the base 110. For example, in some instances, protuberances 112 closer to the center C of the base 110 may be shorter than the protuberances 112 located at an outer peripheral edge E of the base 110. Stated otherwise, the protuberances 112 may vary in height from the center C of the base 110 to the outer peripheral edge E of the base 110 in a graduated manner. Any suitable variation of the height, size, and configuration of the protuberances 112 along the radius of the base 110 may be used herein to accommodate any number of drone 106 sizes and configurations. More so, the area covered by the protuberances 112 (and the overall size of the landing platform 104), can be selected to accommodate drones 106 of varying sizes and shapes. In some instances, the size of the landing platform 104 may be larger than the profile of the rotors of the drone 106 and/or the entire drone 106.

Figure 3A:
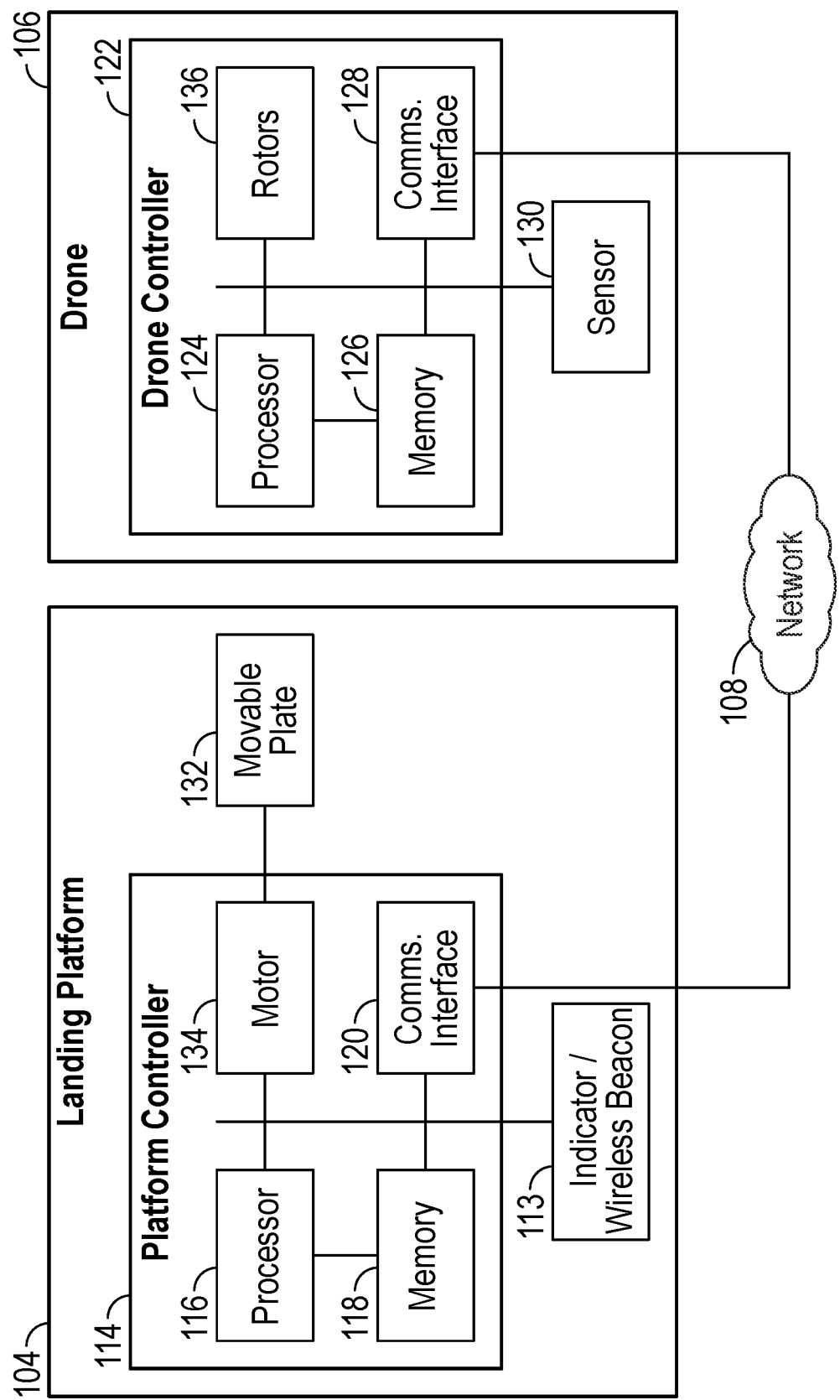
FIG. 3A is a schematic diagram of a landing platform and a drone in accordance with one or more embodiments of the present disclosure.

In certain embodiments, referring to FIGS. 2 and 3A, the landing platform 104 can include an indicator 113 and a platform controller 114. In certain embodiments, the indicator 113 may be a passive indicator, such as a visual indicator (e.g., a quick response code, a barcode, an image, or any other visually distinct pattern). The indicator 113 can be placed about a space at the center C of the base 110 defined by a first ring of the protuberances 112 disposed around the indicator 113. The indicator 113 may be disposed at any location about the landing platform 104. The indicator 113 may be any suitable size, shape, or configuration.

In other instances, the indicator 113 can be and active device, such as a wireless beacon, which can be operated by the platform controller 114. In this manner, the indicator 113 can be used by the drone 106 to identify the landing platform 104 and land thereon. When the indicator is active, the platform controller 114 of the landing platform 104 can provide the drone 106 with landing instructions or other information. For example, when the landing platform 104 is mobile (e.g., attached to a moving vehicle), the platform controller 114 can inform the drone 106 of its groundspeed, as well as other ambient conditions, such as wind speed, etc.

Referring now to FIG. 3A, the platform controller 114 can include a processor 116 and memory 118. The processor 116 may be configured to execute instructions in the memory 118 to perform the methods disclosed herein. It will be understood that when referring to operations performed by the controller, this includes the execution of instructions by the processor 116. Also, the controller 114 can transmit and/or receive data over the network using a communications interface 120. The drone 106 may include a drone controller 122, which includes a processor 124 and memory 126. The processor 124 may be configured to execute instructions in the memory 126 to perform the methods disclosed herein. It will be understood that when referring to operations performed by the drone controller, this includes the execution of instructions by the processor 124. Also, the drone controller 122 can transmit and/or receive data over the network using a communications interface 128. The drone 106 can also include a sensor 130 (e.g., a camera or the like) or another sensor that can be used to identify the indicator 113 or other passive landing platform identifiers. When the indicator 113 is active, the drone controller 122 can receive signals from the indicator 113 and use the signals to locate the landing platform 104 and center itself above it.

In certain embodiments, in operation, the drone 106 can depart from the launching platform 102, which can be integrated into the roof of a vehicle. In other instances, the launching platform 102 may be integrated into the bed of a truck or the like. In yet other instances, the launching platform 102 may be stationary (e.g., fixed to a permanent structure or the ground). The drone 106 can be launched from any other location as well. Once in flight and the drone 106 is ready to land, the drone controller 122 can utilize data from the sensor 130 (e.g., images from a camera) to identify the indicator 113 of the landing platform 104. As noted above, the drone 106 can also sense the indicator 113 using signals when the indicator 113 is active and broadcasting signals.

In some instances, once the drone 106 locates the landing platform 104, the drone controller 122 can cause rotors 136 of the drone 106 to slow or stop. When the rotors 136 of the drone 106 are shrouded by a cage or otherwise protected, the drone 106 may land on the landing platform 104 with the rotors moving. The done 106 may land in either instances with the rotors spinning, slowing down, or stopped. However, in some instance, when the rotors 136 are not shrouded, they may cause damage to the protuberances 112 when the drone 106 lands and makes contact with the protuberances 112.

In order to land on the landing platform 104, the drone 106 may descend towards the landing platform 104. The drone 104 may contact the protuberances 112, which may capture the drone 106 on the landing platform 104. For example, the various components of the drone 106, including the body, landing gear, and rotors, may be positioned between the protuberances 112 as the drone 106 lands on the landing platform 104. That is, the protuberances 112 may bend and flex around the various components of the drone 106 in order to capture the drone 106 on the landing platform 104. The resilient protuberances 112 may bend around the various components of the drone 106 and apply a pressure to the various components in order to capture the drone 106 on the landing platform 104. A user can obtain the drone 106 by lifting the drone 106 up and away from the protuberances 112. Once the drone 106 is removed from the landing platform 104, the protuberances 112 may move back to their original repose positions.

In some instances, when the drone 106 senses the indicator 113, the drone controller 122 can transmit control signals that cause the rotors 136 of the drone 106 to slow or stop rotating. This causes the drone 106 to descend and land. The can include a controlled descent or a freefall descent. Regardless of the type of descent, the protuberances 112 arrest the drone 106 when it makes contact with the landing platform 104.

Figure 3B:
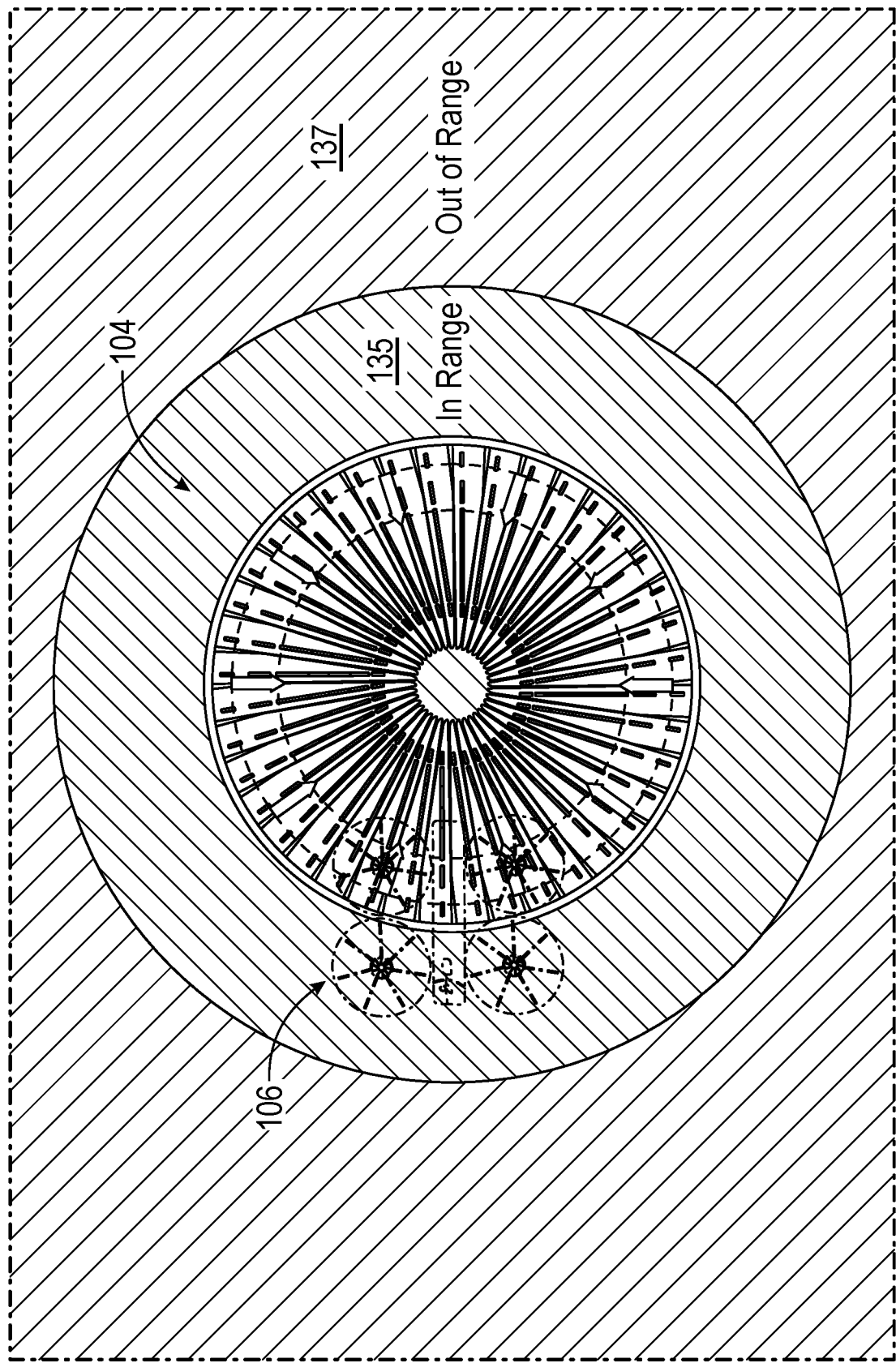
FIG. 3B illustrates various landing zones around a landing platform in accordance with one or more embodiments of the present disclosure.

FIG. 3B illustrates an example schematic view of landing zones around the landing platform 104. The drone 106 can locate itself near or over the landing platform 104 using an indicator as described above. In certain embodiments, the drone 106 is considered to be "in range" when in a first concentric landing zone 135 around the landing platform 104. The first concentric landing zone 135 can be measured as a distance from the center C of the landing platform 104 and/or the indicator 113. Landing may be considered possible for the drone 106 when it is inside the first concentric landing zone 135. However, when the drone controller 112 determines that the drone 106 is above a second concentric landing zone 137, the drone 106 may be considered "out of range" and may not land. For example, any position of the drone 106 outside the first concentric landing zone 135 may be considered to be out of range. Using these landing zones allows for greater variability in drone landing compared to a perfect centering of the drone on the landing platform 104, which may not be feasible in certain conditions (e.g., high wind).

In one example, after performing flight operations, the drone 106 may approach the landing platform 104 using the indicator 112 as a guide. At an optimal altitude (which may vary based on drone size and operating parameters) and directly above the landing platform 106, the rotors 136 can be slowed and the drone 106 can enter a decent, or the rotors 136 may be stopped and the drone 106 can enter a freefall. As noted above, if the geometry of the rotor cages permits, the rotors 136 do not have to lock and the drone 106 can perform a typical landing sequence. The flexible protuberances 112 may cushion the landing of the drone 106. Some protuberances 112 may bounce, bend, and flex into shape around the drone 106, and some protuberances 112 may be caught beneath or pushed aside. The motion of the drone 106 in any direction is damped such that damage to the structure of the drone 106 is unlikely. More so, the protuberances 112 may flex around and grasp on to various components of the drone 106.

In some instances, both a launching platform and landing platform can be used. In other instances, the drone 106 can launch and land on the same platform. That is, the launching platform and landing platform may be one and the same. In certain embodiments, the landing platform 104 may comprise a floating or movable plate 132 that is controlled by a motor 134. The motor 134 can be actuated by the platform controller 114.

To allow the drone 106 to sit flat against the upper surface of the movable plate 132, the motor 134 engages one or more drive mechanisms that cause the movable plate 132 to translate upwardly. The movable plate 132 can include apertures that allow the protuberances 112 to translate therein. That is, the movable plate 132 can be moved upwardly until the protuberances 112 are located below the movable plate 132. The drone 106 can sit on the flat upper surface of the movable plate 132 and launch. When the drone 106 is launched, the platform controller 114 can engage the motor 134 to lower the movable plate 132 exposing the protuberances 112. When the drone 106 lands on the landing platform 104, the platform controller 114 can actuate the motor 134 to again translate the movable plate 132 upwardly until the drone 106 is sitting on a flat surface of the movable plate 132.

Figure 4:
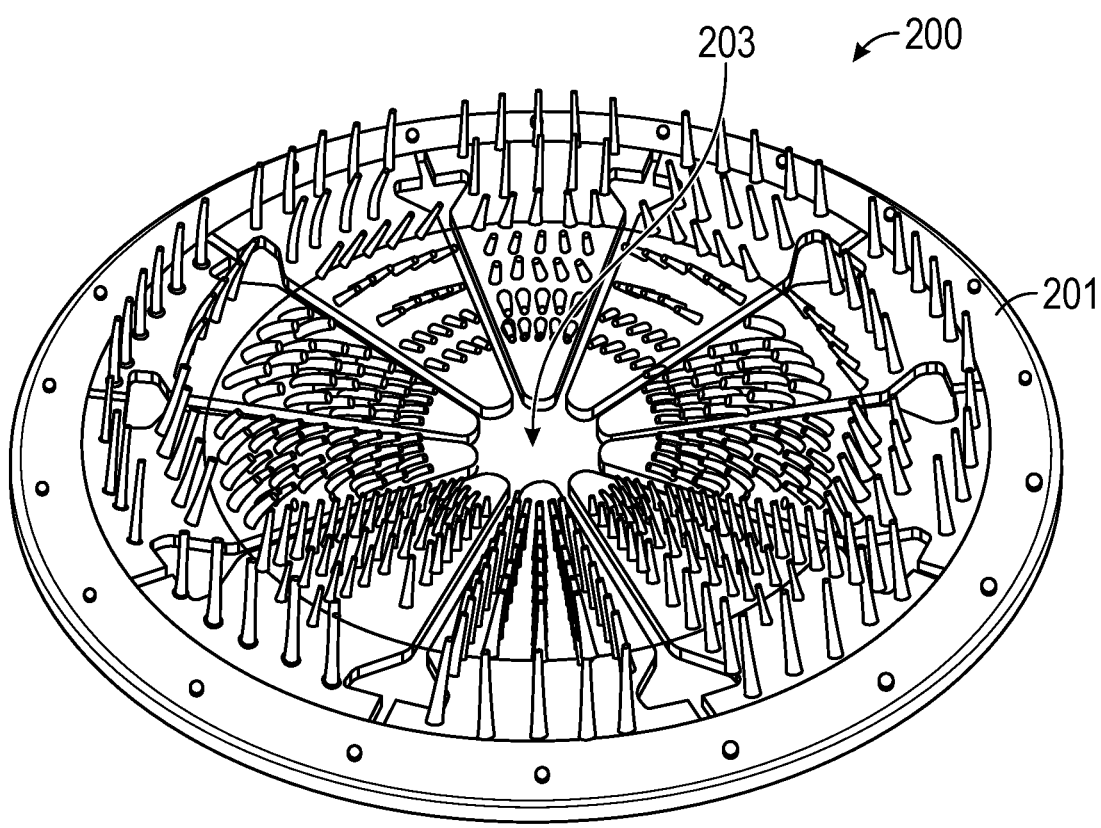
FIGS. 4 and 5 collectively illustrate an example landing platform in accordance with one or more embodiments of the present disclosure.
Figure 5:
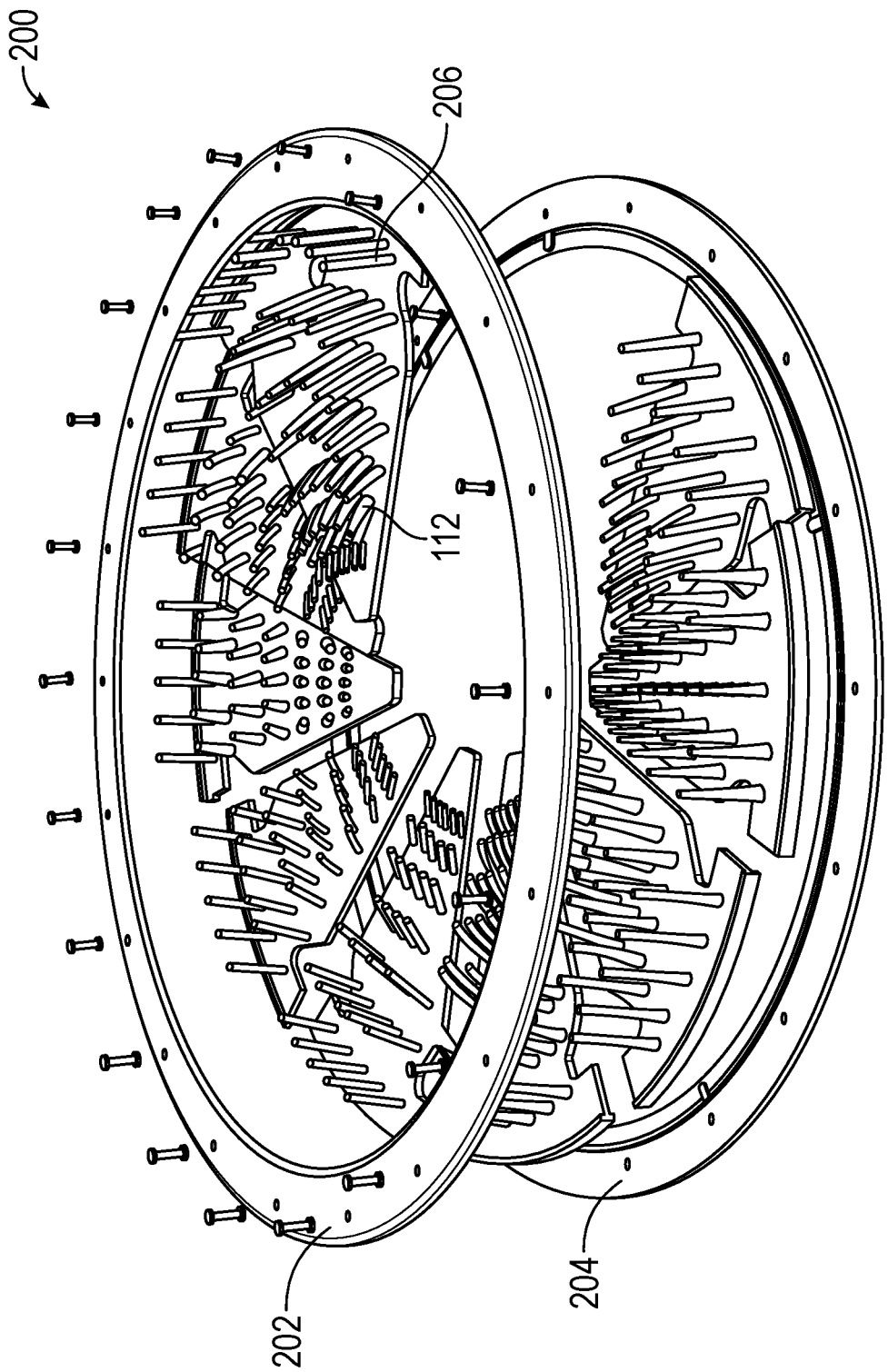

FIGS. 4 and 5 collectively illustrate another example landing platform 200 that can receive a drone. The landing platform 200 includes a support structure 201. The support structure 201 may include two ring supports 202 and 204 and a plurality of flaps 206. Each of the flaps 206 is provided with protuberances 112. Each flap 206 may include rows of protuberances 112 that have different orientations relative to one another. The protuberances 112 near the center of the landing platform 200 may be angled inwardly towards the center of the landing platform 200. As the rows of protuberances 112 progress to the outside of the landing platform 200 towards the ring support 202 and 204, the protuberances 112 are progressively straighter (e.g., more orthogonal) relative to the flaps 206. That is, the protuberances 112 may become progressively more upright from the center to the periphery of the landing platform 200. The flaps 206 may be arranged to allow a drone 106 to be pulled through the landing platform 200. For example, each of the flaps 206 may be arranged about the circumference of the landing platform 200 and attached to the ring supports 202 and 204. For example, the outer edge of each flap 206 may be sandwiched between the ring supports 202 and 204. In this manner, each of the flaps may be cantilevered towards the center of the landing platform 200. The flaps 206 may be spaced apart from one another at the center of the landing platform 200 to form an opening 203, in which a user may reach through and pull a drone through.

Thus, the landing platform 200 can be mounted or otherwise associated with a sunroof or other roof aperture of a vehicle. That is, the landing platform 200 can be adapted to be associated with an opening of a sunroof or moonroof of a vehicle. For example, the sunroof can be opened at the landing platform 200 can be placed into the opening. Thus, although not shown, the landing platform 200 can be associated with a frame that is sized to fit the opening of the sunroof. A user inside the vehicle may obtain the drone by pulling it through the landing platform 200 into the vehicle. In some configurations, the flaps 206 are triangular and the protuberances 112 are positioned on the triangular flaps. The flaps 206 may be configured to displace to allow the drone 106 to be pulled through a lower end of the landing platform 200 when the drone 106 has landed thereon.

Figure 6:
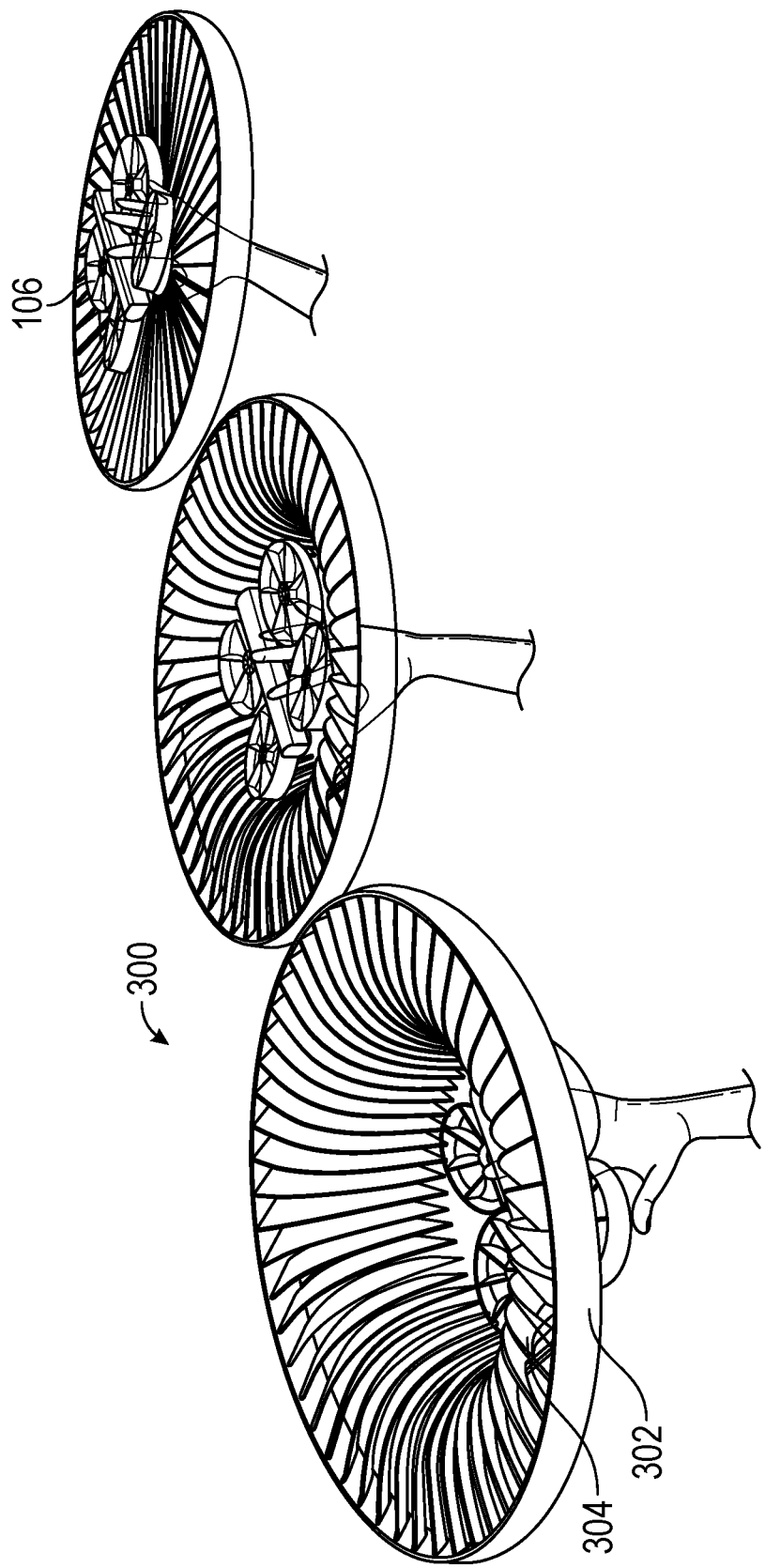
FIG. 6 illustrates an example landing platform in accordance with one or more embodiments of the present disclosure.

FIG. 6 diagrammatically illustrates a landing platform 300. In use, the landing platform 300 enables the extraction of a drone 106 from the bottom of the landing platform 300. The platform 300 includes a rim 302 (e.g., ring structure or the like) and a plurality of resilient blades 304 that are downwardly curved. The resilient blades 304 can both support a drone 106, as well as deform to allow the drone 306 to be pulled downwardly through the landing platform 300. It will be understood that any of the protuberance designs or combinations thereof disclosed herein (e.g., conical, blade, flap, and so forth) can be interchanged and used as desired with the blades.

Figure 7:
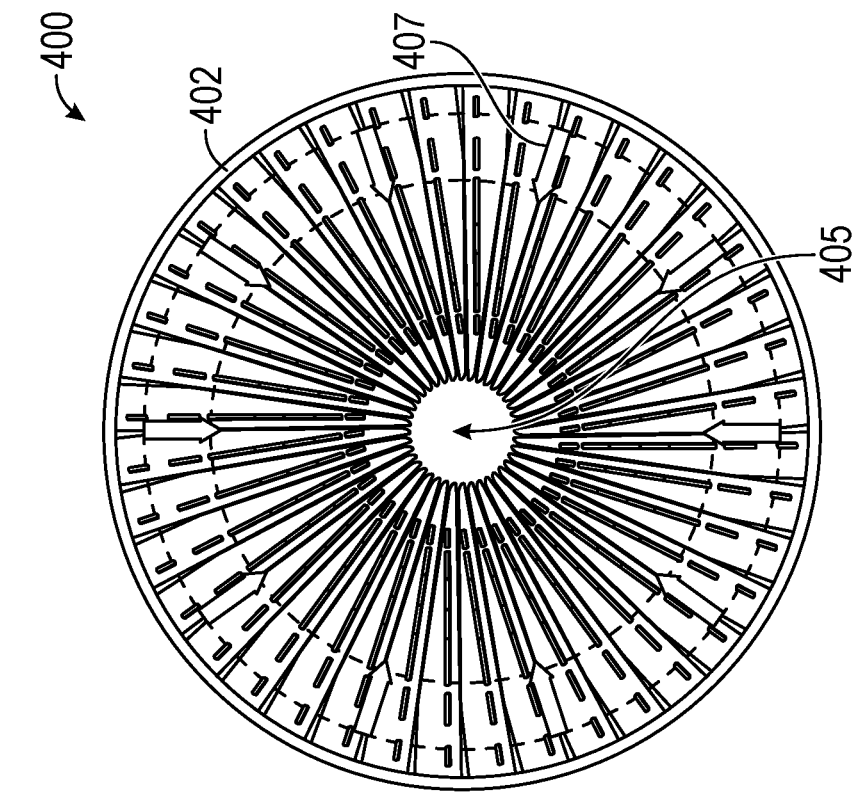
FIG. 7 illustrates an example landing platform in accordance with one or more embodiments of the present disclosure.
Figure 7:
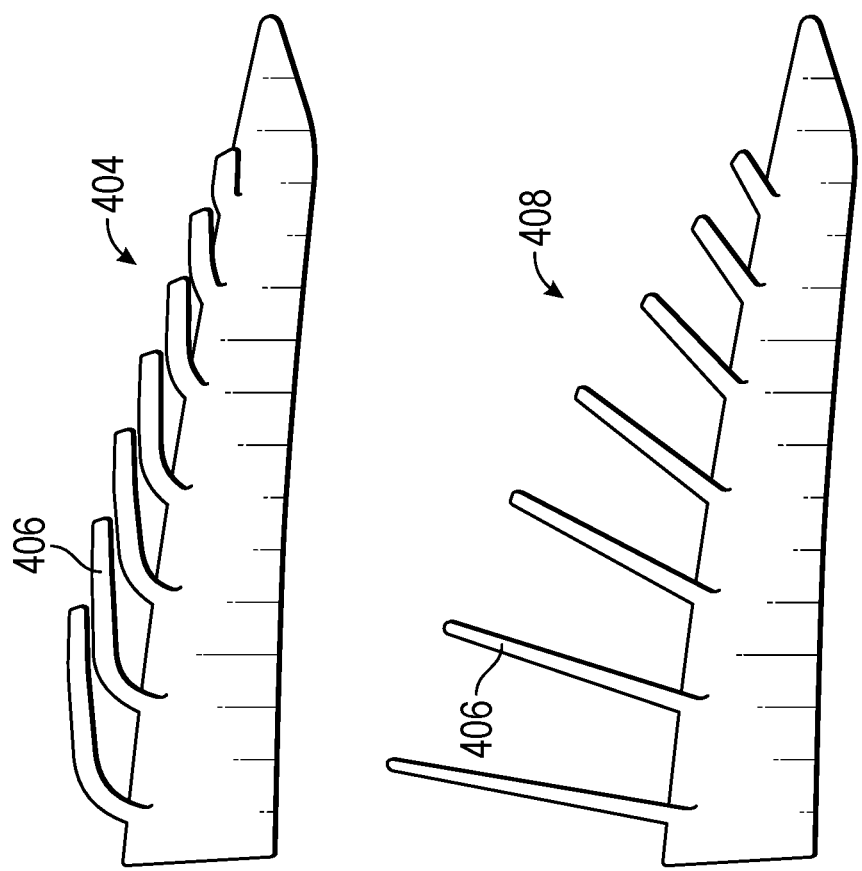

FIG. 7 illustrates a landing platform 400. The landing platform 400 includes a ring support 402 and a plurality of blades 404 that are similar to the blades of the landing platform of FIG. 6. Additionally, each of the plurality of blades 404 includes a plurality of protuberances 406 that are arranged along a length of each blade 404. The protuberances 406 can be curve inwardly towards a center of the landing platform 400. As illustrated in view 408, the protuberances 406 can be linear rather than curved in shape. More so, the length of each of the protuberances 406 may vary. For example, the protuberances 406 may get progressively shorter from the circumference of the landing platform 400 to the center 405 of the landing platform 400. In addition, the protuberances 406 may be angled inward towards the center 405 of the landing platform 400. In some instances, the inward angle may progressively increase from the circumference of the landing platform 400 to the center 405 of the landing platform 400. As indicated by the arrows 407, the curvature and/or inwards angle of the protuberances 406 and/or the blades 404 may tend to draw a drone landing on the landing platform 400 towards the center 405 of the landing platform 400.

The plurality of blades 404 terminate to form a central aperture 405 in the center of the landing platform 400. The plurality of blades 404 are resilient and can both support a drone as well as deform to allow the drone to be pulled from a lower end of the landing platform 400.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A device for landing a drone, comprising:
   a support structure; and
   a plurality of triangular flaps connected to the support structure, wherein the triangular flaps are configured to support a drone and be displaced to allow the drone to be pulled through a lower end of the device when the drone has landed; and
   a plurality of protuberances that are arranged on the triangular flaps, wherein each of the protuberances are resilient and configured to arrest and protect the drone during landing.

2. The device according to claim 1, wherein the device is configured to be position about an opening of a sunroof or moonroof of a vehicle.

3. The device according to claim 1, wherein at least a portion of the protuberances are angled inwardly towards a center of the device.

4. The device according to claim 3, wherein an angle of the protuberances that are angled inwardly towards the center of the device increases as the protuberances get closer to the center of the device.

5. The device according to claim 1, wherein at least a portion of the protuberances at an outer peripheral edge of the support structure extend orthogonally to the triangular flaps.

6. The device according to claim 1, wherein a height of the protuberances varies along the device such that the protuberances a an outer peripheral edge of the device are taller than the protuberances near a center of the device.

7. The device according to claim 1, further comprising a platform controller configured to control signals output by an active wireless beacon positioned on the device.

8. A device for landing a drone, comprising:
   a support; and
   a plurality of resilient blades connected to the support and terminal towards a center of the device, wherein the resilient blades are configured to support a drone and be displaced to allow the drone to be pulled through a lower end of the device when the drone has landed.

9. The device according to claim 8, further comprising protuberances arranged along a length of each of the resilient blades.

\* \* \* \* \*